June 4, 1968   D. J. BROWN ET AL   3,386,299
VARIABLE SPEED POWER TRANSMISSION
Filed Oct. 20, 1965   2 Sheets-Sheet 1

DONALD J. BROWN
JERRY C. HANLON
INVENTORS.
WHANN & McMANIGAL
BY Attorneys for Applicant

3,386,299
VARIABLE SPEED POWER TRANSMISSION
Donald J. Brown, La Crescenta, and Jerry C. Hanlon, Rosemead, Calif., assignors to The Cowles Dissolver Company, Inc., Cayuga, N.Y., a corporation of New York
Filed Oct. 20, 1965, Ser. No. 498,405
6 Claims. (Cl. 74—230.17)

ABSTRACT OF THE DISCLOSURE

A variable speed power transmission in which a V-belt is trained over a diameter adjustable V-pulley formed by a fixed member and associated movable member on a drive shaft, and a diameter adjustable V-pulley formed by a fixed member and a movable member on a driven shaft, adjusting rocker means being connected to the movable member on the drive shaft including a first swingable lever, and adjusting rocker means connectible to the movable member on the driven shaft including a second swingable lever, the first lever being of greater length than the second lever and these levers being interconnected at their outer ends by an extensible link containing telescoped members surrounded by a compression spring having its opposite ends respectively connected with the telescoped members, this spring normally acting to move the driven V-pulley members towards a position of greatest pulley diameter, one end of the spring moving a greater distance than the other end, when the first lever is moved by a connected adjusting screw means to adjust the delivery speed of the driven shaft, whereby the effective spring pressure acting on the driven V-pulley will be increased at its greatest diameter and decreased at its smallest diameter.

Also disclosed is the key arrangement for nonrotatably, but axially slidably securing the adjustable pulley members on their associated shaft by using a key of self-lubricating plastic material of rectangular cross section and providing key slots respectively on the shaft and surrounding part of the adjustable pulley member, these slots having abutment shoulders respectively making full face engagement with transversely opposite faces of the key so as to place the key material between such faces in compression rather than in shear.

---

The present invention relates generally to power transmission apparatus, and is more particularly concerned with transmissions of the V-belt variable speed type.

Conventional variable speed transmissions of the V-belt type having variable diameter drive and driven pulleys are in general limited with respect to the amount of horsepower which can be effectively and economically transmitted. Tests have indicated that above substantially 50 H.P., heating and decreased life of the V-belt requires the use of double transmission arrangements which become expensive and cannot always be installed within available space.

The power transmitting limitations in V-belt variable speed transmissions of the above character result from a number of inherent factors. A main limiting factor is due to belt heating as a result of belt slippage on the pulleys. For example, if the belt slippage increases above substantially 3%, the generated heat decreases the coefficient of friction of the belt and causes its rapid deterioration and early failure.

In view of the foregoing, the amount of horsepower which can be transmitted at low delivery speeds must necessarily be limited. However, as the speed increases, more power can be transmitted due to an increase of belt cooling. Where the power requirements approach or exceed 50 H.P., critical design problems arise. If the transmission is designed to take motor overloads above the normal power requirements, then the transmission is over designed and will not perform satisfactorily at the low speeds, while a design giving preference to satisfactory operation at a low speed will result in undesirable operations at the higher speeds. A compromised design is usually used, and as a result the transmission lacks the desired efficiency of operation at both low and high speeds.

Another limiting factor with respect to variable speed transmissions utilizing a spring for automatically adjusting the driven pulley in response to variations of the driving pulley, stems from the inherent manner in which the conventional transmission devices utilize the effective spring pressure at the low speed and high speed conditions of operation. At low speeds, where greater torque would be required to obtain a higher output or constant horsepower delivery compatible with the horsepower delivered at the higher speed, the spring will be in an expanded condition so that its effective pressure will have a low value. Conversely, at the higher speeds, when less torque is required to deliver full horsepower, the spring will be in a compressed condition so that the pressure at this time will be at a high value. It will thus appear that the spring operates in a reverse manner to that required to provide the most effective and efficient transmission of power.

Still another important design factor of variable speed belt transmissions concerns the matter of spring scale, that is, the force in pounds required to compress the spring one inch. The importance of this factor may, for example, be illustrated by considering a transmission for transmitting 50 H.P. With a spring scale of 70 pounds per inch, in a conventional transmission, if the spring has a pressure of 500 pounds at the low speed limit, a compression of three inches will raise the effective spring pressure to 710 pounds at the high speed. In such conventional arrangement any pressure above 710 pounds would be excessive. The force which opposes shock loads at all speeds is 70 pounds, and at such low pressure there might not be a sufficient force to recover from the shock load condition.

In the present invention, where the action of the spring is reversed so that a greater effective spring force occurs at the low speed and a low effective spring force occurs at the high speed, it is possible to make use of higher spring scale values. For example, tests have indicated in the case of a 75 H.P. motor instead of a 50 H.P., a spring scale of 220 pounds, which may be obtained by utilizing a single spring or two springs working together, may be used successfully. With such a spring, an effective spring force of 1500 pounds at low speed in a two and three-quarter inch travel will provide a 900 pound force at the high speed. Thus, under substantially compatible spring pressures, a spring scale force of 220 pounds now resists shock loads and therefore will provide an operating condition where recovery will be assured.

Having the aforegoing inherent limitations and disadvantages of conventional belt type variable speed transmissions in mind, it is one object of the present invention to provide an improved variable speed transmission which will operate to deliver substantially constant horsepower within its speed range of variation, and make available high horsepower outputs at the lower speeds.

A further object is to provide a variable speed V-belt transmission having a spring adjusted driven pulley in which the effective force of the spring will be highest at the lowest speed, and lowest at the highest speed of the driven pulley.

Another object is to provide an improved variable speed transmission of the above noted type, in which it is possible to utilize springs having greater spring scale for opposing shock loads and provide higher recovery than now possible in conventional variable speed transmissions.

Another object is to provide an improved sliding support for the variable diameter pulley sheaves which involves a novel keying securement in which friction, sluggishness and erratic functioning will be substantially reduced and greater efficiency obtained.

Yet another object is to provide a V-belt variable speed type of power transmission which can be operated as a constant horsepower transmission to deliver high horsepower at low speed, which has a high degree of operating efficiency and can transmit greater horsepower than is possible with conventional single belt variable speed types of transmissions now available; and which will have long operating life for the belts.

Further objects of the invention will be brought out in the following part of the specification, wherein detailed description is for the purpose of fully disclosing the invention without placing limitations thereon.

Referring to the accompanying drawings which are for illustrative purposes only:

Figure 1:
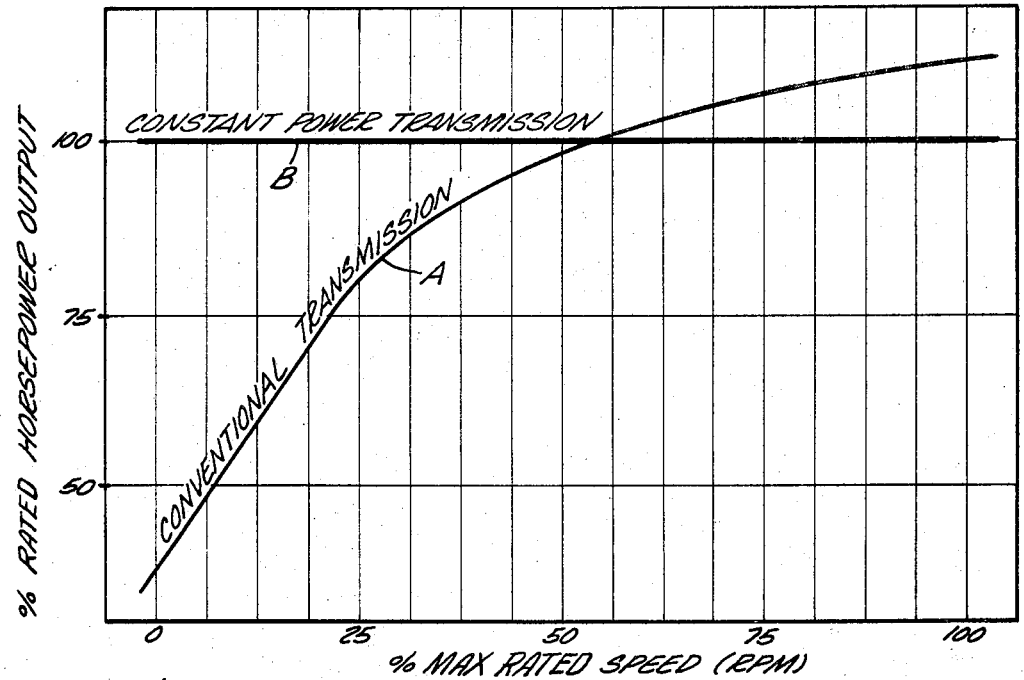
FIG. 1 is a graph illustrating the horsepower transmission characteristics of a conventional variable speed transmission and a variable speed transmission embodying the features of the present invention.

Referring more specifically to the drawings, for illustrative purposes, there is illustrated in FIG. 1 a graph in which percentage of maximum horsepower output is plotted against speed for a conventional V-belt variable speed transmission as shown by curve A and a variable speed constant horsepower output variable speed transmission according to the present invention as shown by line B. These graphs are based upon a condition of 3% slip, and for transmissions having a 3:1 speed ratio.

It will be observed that conventional transmissions are designed to provide 100% rated horsepower output when the drive and driven shafts are operating at the same speed. With the conventional transmission it will be observed that the delivered horsepower at the low speeds is reduced but that as the speed is increased the horsepower increases until an overload condition of the motor may be obtained. As previously explained, this type of operation is unsatisfactory, particularly in installations where high horsepowers are required at low speeds. In the transmission of the present invention it is possible to obtain a constant horsepower output characteristic as shown by the line B which permits the motor to operate at its rated power and deliver high horsepower outputs at the low speeds while at the same time keeping the operating parameters of the belt within safe and acceptable limits.

Figure 2:
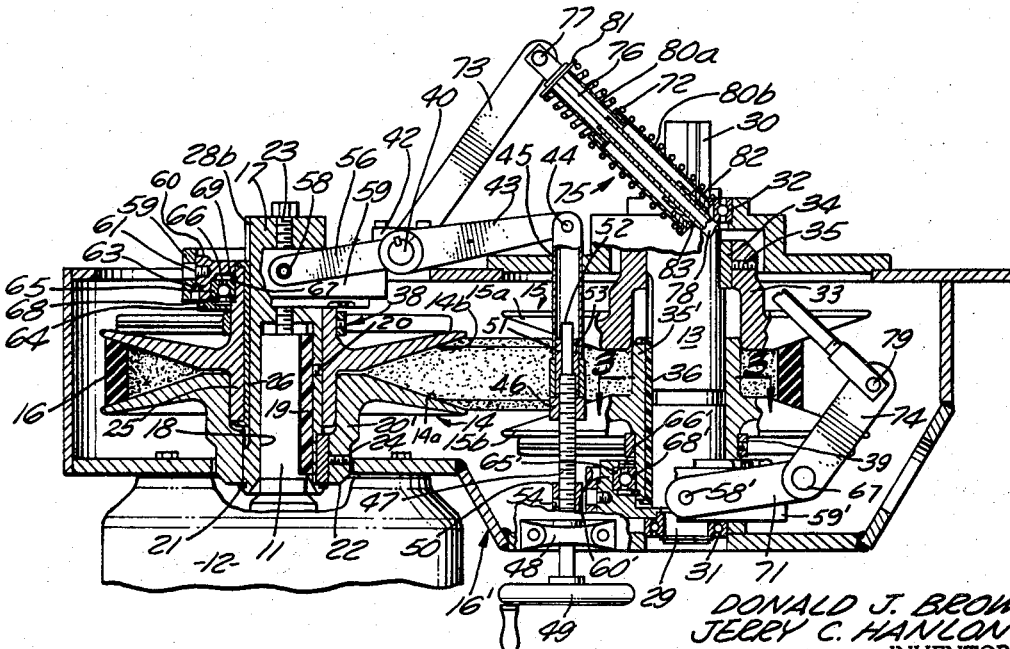
FIG. 2 is a side elevational view of a transmission according to the present invention, portions being cut away and another portion sectioned to disclose details of construction.

As shown in FIG. 2, the power transmission, as generally indicated by the numeral 10, is shown as being drivably interconnected between a drive shaft 11 of a power source such as an electric motor 12, and a driven shaft 13 which may constitute a final power delivery shaft, or may be utilized as an intermediate or a countershaft of a multistage transmission system.

The drive shaft carries a variable diameter V-pulley 14 which includes relatively adjustable members consisting of a fixed lower half 14a and movable upper half 14b. The driven shaft 13 carries a variable diameter V-pulley 15 which includes relatively adjustable members consisting of a fixed upper half 15a and a movable lower half 15b. The V-pulleys are interconnected by a V-belt 16 by which power may be delivered from the constant speed motor to the shaft 13 and delivered at varied speeds depending upon the adjustment of the variable speed transmission.

The various components of the variable speed transmission are assembled and operatively mounted within a frame structure and housing 16' which may vary as to configuration as well as details. As shown, the drive shaft 11 is provided with a sleeve extension 17 having an internal bore 18 adapted to receive the drive shaft endwise therein, an anchor key 19 and set screw 20 being provided to secure the sleeve against rotation on the shaft in conventional manner. The lower half of the V-pulley is secured at its hub portion 20' against an abutment retaining ring 21 and keyed to the sleeve by means of a key 22 held by a set screw 24. The upper end of the sleeve 17 is closed and has an elongate threaded bolt 23 supported therein so that the inner end of the bolt bears against the end of the shaft 11. The bolt 23 provides means for adjustably positioning the sleeve and the connected lower half 14a with respect to the shaft 11. Once the position is determined, the parts are anchored by means of set screw 20.

Figure 3:
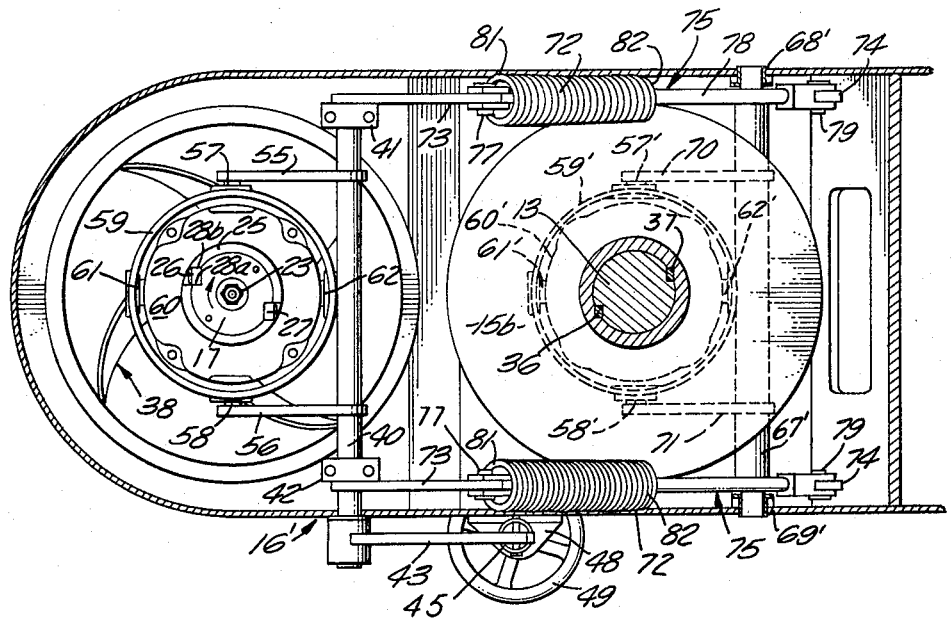
FIG. 3 is a plan view of the same including a transverse section taken substantially on line 3—3 of FIG. 2.

The upper half 14b of the V-pulley is provided with an elongate tubular hub 25 which is axially slidable on the sleeve 17, but is keyed against relative rotational movement by means of a pair of key members 26 and 27 (FIG. 3) which are anchored at their ends to the tubular hub 25 and extend into and have sliding relation with the sleeve 17. These keys are made of a plastic material which is self-lubricating. As shown in FIG. 3, these keys are of rectangular cross section and are mounted in right angled V-grooves 28a and 28b which are respectively formed in the sleeve 17 and tubular hub 25 and cooperate to form a key bore of rectangular cross section in which the long axis of the cross section extends tangentially to the sleeve. With this arrangement, the key material is put into compression rather than shear, thus making it possible to utilize a plastic material having self-lubricating characteristics. By this means, it is possible to avoid the undesirable characteristics such as Brinelling, sluggishness and high friction which may occur in the case of metal keys.

The driven shaft 13 is provided with end extensions of reduced diameter as respectively indicated at 29 and 30 by means of which the shaft is rotatably mounted in appropriate antifriction end bearings 31 and 32. The shaft 13 carries the upper and lower halves of the V-pulley 15 in a similar manner to that previously described for the V-pulley 14 on the sleeve 17. The fixed upper half 15a is in this case provided with a hub portion 33 which surrounds the upper end of the driven shaft 13 and is fixedly secured thereon by means of a key 34 and associated set screw 35. The movable lower half 15b is in this case provided with an elongate tubular hub 35', this hub being similarly keyed to the driven shaft 13 by means of a pair of plastic key members 36 and 37 in the same manner and for the same purpose as previously described for the movable half 14b of the V-pulley 14. This type of connection is particularly desirable with respect to the driven V-pulley in order to avoid any undesirable operating conditions which might interfere with the free movement of the movable half 15b of the V-pulley, and which might tend to reduce its recovery capacity under shock load conditions.

In order to increase the efficiency of operation of the variable speed transmission of the present invention, the hub portion 25 of the movable half 14b carries a cooling fan 38, and the hub portion 35' a cooling fan 39.

Manually operable actuating means are provided for shifting the movable half 14b of the drive V-pulley 14 in order to vary the speed of the driven pulley of the transmission. For such purpose, a transversely extending rocker shaft 40, as shown in FIG. 3, is rotatably supported in suitable bearings 41 and 42. At one end, the rocker shaft carries a lever 43 which is connected at its outermost end by a pivot pin 44 to the uppermost end of a tubular elongate sleeve 45 of manually adjustable means for rocking the shaft 40. The sleeve 45 at its lowermost end is provided with an internally threaded end cap 46 which is in threaded engagement with an elongated threaded rod 47 having its lowermost end rotatably supported from the frame structure by a bearing 48. This end of the rod carries a hand wheel 49 by means of which the rod can be rotated within the end cap so as to adjustably swing the lever 43 between limits as established by a lower stop member 50 and an upper stop member 51. The stop member 51 is constructed as a threaded end cap having threaded engagement with the uppermost end of the rod, the cap being apertured at its closed end to receive a rod extension 52 upon which it is rotatable for limited axial adjustments, and when in desired position may be secured to the rod extension by means of a set screw 53. The stop member 50 is in the form of an internally threaded sleeve which may be axially adjusted on the rod 47 and secured in adjusted position by a set screw 54.

Rocking movements of the shaft 40 are utilized to shift the movable upper half 14b of the V-pulley 14 so as to change its diameter and the speed at which the driven shaft 13 will be actuated. For such purpose, the shaft 40 is provided with a pair of arms 55 and 56 which are pivotally connected at their outermost ends by pivotal means 57 and 58 to diametrically opposed points of an outer ring member 59 of a gimbals connection in which an inner bearing housing ring structure 60 is supported at diametrically opposite points by pivot means 61 and 62 on the outer ring member 59.

As shown in FIG. 2, the bearing housing includes a main ring member 63 and a retaining end ring 64 which clampingly engage and support the outer race 65 of an antifriction bearing 66. The inner race 67 of this bearing is secured to the tubular hub 25 of the movable upper half of the V-pulley 14 by being retained against an abutment shoulder 68 on the hub by means of a retaining ring 69. A thrust bearing connection is thus formed with the movable upper half 14b of the pulley, and through the gimbals connection permits adjusting movements of the rocker shaft 40 to be transmitted thereto in response to adjustments of the hand wheel 49 and thus change the speed setting of the variable speed transmission.

In the conventional variable speed transmission of this type, the movable half of the driven pulley would normally be urged towards the fixed half, and towards a maximum effective pulley diameter, by means of a compression coil spring. In the present invention a different spring mounting is utilized in order to secure an effective spring pressure which acts reversely to that of the spring in conventional arrangements. In the conventional arrangement, the effective spring pressure was at a minimum when the driven V-pulley was rotated at low speed, and at a maximum when rotated at high speed. This is just the reverse spring force action required in order to operate a transmission of the herein described character as a constant horsepower device wherein less torque is required to be transmitted at the high speed than at the low speed when greater torque is required to get the same horsepower. The spring arrangement of the present invention is thus arranged to provide a greater effective force at slow pulley speed and a lower effective force at the higher pulley speeds.

In the present invention, the spring urging force is applied to the movable half of the V-pulley 15 by a gimbal connection similar to that previously described for the drive pulley. Primed numbers will be used to indicate the corresponding elements of the gimbals connection for the driven pulley.

For this purpose, a rocker shaft 67' is rotatably supported on the frame structure by end bearings 68' and 69' and is connected by spaced arms 70 and 71 with the pivot means 57' and 58' to the outer ring member 59' of the gimbals connection.

The rocking movements of shaft 40 are transmitted to shaft 67' through dual linkages each containing a spring 72, these springs coacting to normally urge the movable half of the V-pulley 15 towards the fixed half thereof. Since each of the spring linkages is similar, it is believed that it will be necessary to described only one of these connections.

Each linkage comprises a first lever arm 73 carried by the shaft 40 and a second lever arm 74 carried by the shaft 67'. The outer ends of these arms are interconnected by a variable link structure as generally indicated at 75. This structure includes a rod 76 having one end pivoted at 77 to the outer end of the arm 73, and its other end in telescoping relation with one end of an elongate tube 78, the other end of this tube being pivotally connected at 79 to the outer end of lever arm 74. The spring 72 is positioned adjacent the pivotal connection 77 and is supported upon an internal cylindrical structure composed of tube sections 80a and 80b having their inner ends in telescoped relation. The outer end of section 80a is secured to a stop member 81 which is affixed to the rod 76 and also forms an abutment for the adjacent end of spring 72. The outer end of section 80b is connected to an annular member 82 which forms an abutment for the adjacent other end of spring 72, the annular member being internally threaded for engagement and adjustable positioning upon a threaded sleeve 83 which is welded or otherwise secured in surrounding fixed relation to the tube 78. As thus arranged, it will be apparent that with the lever arm 73 retained in a fixed position, the forces of the spring 72 would be applied against the movable half 15b of the V-pulley 15 in the same manner as in conventional variable speed transmissions of this type. However, lever arm 73 is not in operation retained in a fixed position but will follow the movements of lever 74. It is important to note in this connection that the lever arms 56 and 71 are of equal length so that corresponding movements thereof will be accompanied by corresponding movements of the movable halves of the V-pulleys 14 and 15. However, it is important to note that the length of the lever arm 73 is twice the length of either the arm 56 or arm 74. Thus, for a given movement of the rocker shaft 40, the pivoted outer end of lever arm 73 will move through an angle which is twice that of the pivotal means 58 or the pivot 79. As thus arranged it is now evident that for each change in the applied spring force resulting from movement of the spring end which is connected to the annular member 82, there will be an opposite but proportionally greater change effected by movement of the end of the spring which engages the stop 81. It will therefore be noted that, for example, as the movable half 15b is moved towards the fixed half in going from high speed to low speed, instead of the effective force of spring 72 being gradually decreased it will now be gradually increased. It is therefore possible to operate the V-belt variable speed drive of the present invention as a constant horsepower delivery device and through the described innovations of construction obtain a more efficient and long life operating device in which the belt will be operated within safe limits over long periods of time.

By utilizing one or more springs 72 which act in an opposite manner from those of the conventional variable speed transmission, larger spring scales may be used to oppose shock loads at any given speed and assure recovery.

Various modifications may suggest themselves to those skilled in the art without departing from the spirit of our invention, and, hence, we do not wish to be restricted to the specific form shown or uses mentioned, except to the extent indicated in the appended claims.

We claim:

1. A variable speed power transmission, comprising:
 (a) a drive shaft;
 (b) a driven power delivery shaft;
 (c) V-pulley forming members carried by the drive shaft and supported for relative movements towards and away from each other;

(d) V-pulley forming members carried by the power delivery shaft;

(e) means for relatively moving the pulley forming members of the drive shaft including a movable first lever;

(f) means for relatively moving the pulley forming members of the driven shaft including a second lever movable independently of said first lever;

(g) a variable length link member connecting said first and second levers including spring means acting to normally bias the pulley forming members on the power delivery shaft towards each other during adjusting movements of said levers in varying the delivery shaft speed between maximum and minimum limits;

(h) a V-belt trained over the V-pulleys formed by said members and normally maintained under tension by said spring means; and (i) actuator means for adjustably moving said levers, one of said levers being of a different length than the other lever, whereby during speed adjustments the effective force of said spring will be so varied as to relatively provide increased pressure at the minimum speed limit of the delivery shaft and decreased pressure at the maximum speed limit thereof.

2. In a variable speed power transmission:
(a) a rotatable shaft;
(b) a V-pulley having a fixed half secured to said shaft for rotation therewith, and a movable half axially slidable on said shaft;
(c) a key member having a rectangular cross section and being positioned with a transverse axis in substantially tangential relation to a shaft radius, said key member connecting said shaft and movable pulley half for unitary rotation, but permitting relative axial sliding movement; and
(d) key slots respectively on said movable half and said shaft, said slots having shoulders for respectively engaging transverse opposite full faces of said key, whereby to place the key material in compression and not in shear.

3. In a variable speed power transmission:
(a) a rotatable shaft;
(b) a V-pulley having a fixed half secured to said shaft for rotation therewith, and a movable half axially slidable on said shaft;
(c) a key member of self-lubricating plastic material connecting said shaft and movable pulley half for unitary rotation, but permitting relative axial sliding movement, said key member having a rectangular cross section and being positioned with the long axis of the rectangle in substantially tangent relation to a shaft radius; and
(d) key engaging abutment shoulders on said movable half and said shaft oriented to place the key material in compression and not in shear.

4. A variable speed power transmission, comprising:
(a) a drive shaft;
(b) a driven power deliver shaft;
(c) V-pulley forming members carried by the drive shaft, one of said members being supported for relative movements towards and away from the other;

(d) V-pulley forming members carried by the power delivery shaft, one of said members being supported for relative movements towards and away from the other;

(e) a V-belt trained over said V-pulleys;

(f) actuator means operable for adjustably moving the movable member carried by the drive shaft to increase and decrease the diameter of the V-pulley thereon; and (g) a motion transmitting connection with the movable member carried by the driven shaft for varying the diameter of the V-pulley thereon reversely to that of the drive shaft V-pulley in response to actuator means adjustments, said motion transmitting connection including an extensible link formed by telescoping members surrounded by a coiled compression spring having its ends respectively connected to the telescoping members, the movement of one end of said spring during motion transmission being greater than the other end of the spring.

5. A variable speed power transmission, comprising:
(a) a drive shaft;
(b) a driven power delivery shaft;
(c) V-pulley forming members carried by the drive shaft, one of said members being supported for relative movements towards and away from the other;
(d) V-pulley forming members carried by the power delivery shaft, one of said members being supported for relative movements towards and away from the other;
(e) a V-belt trained over the V-pulleys;
(f) a first rocker shaft having a linkage connection with the movable member of the V-pulley on the drive shaft;
(g) a second rocker shaft having a linkage connection with the movable member of the V-pulley on the driven shaft;
(h) an arm carried by the first rocker shaft;
(i) an arm carried by the second rocker shaft, the first arm having a length greater than that of the second arm;
(j) a variable length connection link assembled between the outer ends of said arms including a compression spring having its ends respectively connected with said arms; and
(k) means for adjustably rotating said first rocker shaft.

6. A variable speed power transmission according to claim 5, wherein the drive shaft has two of said arms interconnected with two of said arms on the driven shaft by two of said variable length connection link assemblies.

References Cited

UNITED STATES PATENTS

| | | | |
|---|---|---|---|
| 2,189,294 | 2/1940 | Afleger | 74—230.17 |
| 2,378,375 | 6/1945 | Abbott | 74—230.17 |
| 2,573,937 | 11/1951 | Turnbull | 74—230.17 |
| 2,577,913 | 12/1951 | Peterson | 74—230.17 |
| 2,742,794 | 4/1956 | Yogelsang | 74—230.17 |
| 2,970,493 | 2/1961 | Rieser | 74—230.17 |

FRED C. MATTERN, JR., *Primary Examiner.*

CORNELIUS J. HUSAR, *Examiner.*